INVENTORS
SALVATORE A. CALTA
HARRY A. CARLSON
GERRY D. GRANITO
LYNN W. KAUMEYER
ALPHONSE U. MARCOTTE
BENEDICTO U. MESSINA

BY

ATTORNEY

A ADDRESS FROM UNIT
B INPUT PRIORITY - LOAD QUEUE
C OUTPUT PRIORITY
D STORAGE SELECT
E DATA TO QUEUE
F DATA TO UNIT
G DATA IN UNIT

COMMON CHANNEL CONTROL

United States Patent Office 3,447,135

Patented May 27, 1969

3,447,135

PERIPHERAL DATA EXCHANGE

Salvatore A. Calta, Poughkeepsie, Harry A. Carlson, Wappingers Falls, Gerry D. Granito and Lynn W. Kaumeyer, Poughkeepsie, Alphonse U. Marcotte, Hyde Park, and Benedicto U. Messina, Poughkeepsie, N.Y., assignors to International Business Machines Corporation, Armonk, N.Y., a corporation of New York Filed Aug. 18, 1966, Ser. No. 573,360

Int. Cl. G11b *13/00*

U.S. Cl. 340—172.5 20 Claims

ABSTRACT OF THE DISCLOSURE

A data exchange coupled between a storage area and a plurality of peripheral devices each adapted to generate a signal requesting access to the store, the exchange having a plurality of registers (a queue) to receive such signals, an input priority control to transfer the request to one of the registers in the queue, and an output priority control responsive to the queue and the storage area to selectively transfer store requests signals to the storage area.

This invention relates to a peripheral data exchange for a data processing system and more particularly to an element or unit for the control of massive data flow between the periphery and the system.

In every data processing system, there are two main communication paths: one between the central processor and the main storage and one between the main storage and the various input-output devices and other peripheral devices. To more efficiently utilize the main storage's fast accessing time, information transfers over these two communication paths are normally interleaved. However, only one device can be given access to main storage (or at least to a given location) at a time and, therefore, different priorities are assigned to the respective devices by appropriate circuitry with the central processor normally having the lowest priority.

A unit or element to provide priority implementation and control of data transfer to or from the system periphery must adapt a variety of different data rates of the different devices to the data rates of one or more storage units which also may be characterized by different data rates. The central processor normally has a cycle time that is less than the cycle time of the storage unit and certain peripheral devices may also be characterized by such a mismatch with the storage unit. In prior art systems, the central processor making a storage request could be suspended until it could be serviced. However, in larger systems the suspension time can become unduly long defeating the purpose of having faster processors. On the other hand, if the operation of certain peripheral devices were suspended, and data would be lost. There, such peripheral devices were given highest priority and, if necessary, a bypass directly to storage. Such standard solutions, however, do not improve the interference or amount of suspended time encountered by the processor.

As the data rates of the respective devices are increased or as the number of devices requesting access to main storage is increased, the interference between requests from the different devices increases accordingly. Furthermore, in large data processing systems there is a greater demand for data transfer between the main storage and the CPU as well as a greater need to supply more data between the periphery and the main storage to satisfy CPU demand. This not only results in increased interference on the respective data paths but also results in congestion since a data request which has not been honored must be repeated.

In prior such large scale systems, such interference and congestion problems were often resolved by the employment of a second smaller data processing system to handle data transfer to or from the periphery as well as data arranging and certain pre-processing operations. Such an arrangement provided flexibility since the smaller system could be programmed to perform any general operation. However, systems in which the various subsystems are actuated by the execution of a series of programmed instructions require more time to perform a particular function than is required for a system in which the circuitry is directly wired in various logical combinations to perform the same functions. Furthermore, plural computer systems lack complete synchronization between the computers such that extra time is required to establish interlocks between the two computers whenever there is to be communication therebetween.

Accordingly, it is an object of the present invention to provide an improved unit to control communications to or from the periphery of a data processing system.

It is another object of the present invention to provide improved control of data transfer between a plurality of peripheral devices and storage in an overlapped manner.

It is still another object of the present invention to provide control of data transfer between various elements of the data processing system with a minimum of interference.

It is still another object of the present invention to provide an improved unit for control of data transfer between a plurality of peripheral devices and a storage unit of a data processing system, which devices are characterized by different data rates.

It is still a further object of the present invention to provide an improved control unit to maximize storage cycle availability to all devices requesting storage access.

In prior art data processing systems, priority circuitry determined which requesting device or unit gained access to storage when a storage cycle was available. Thus, lower priority devices would often encounter conditions where either a storage cycle was not available or another device had priority to gain access to storage. Such lower priority devices were, therefore, adapted to have their operation suspended or were provided with buffer registers to prevent the overrun or overflow of data. Such buffering, of course, allowed the particular device to make a later request for storage access. In the present invention there are provided a plurality of general purpose buffer registers that may be accessed by any requesting device (with certain exceptions to be noted below). Such a "queue" has the advantage that it is no longer the availability of storage cycle times that determines whether or not a given device is to be serviced, but rather it is the availability of a queue position which is the determining factor. The number of queue registers provided can be adjusted according to the overall data load anticipated for the particular system. Furthermore, the present invention permits various units to access storage out of sequence in order to better utilize the maximum data rates of each of the respective units in a highly interleaved manner.

Input priority circuitry is employed to handle simultaneous requests to the queue and certain queue positions or registers may be dynamically reserved for the particular units having either high data rates or high service activity. Output priority circuitry is also provided to determine the availability of the particular storage being accessed, the priority of the particular request in the queue for that access as well as whether the request for access in the queue is the first request from the particular unit.

More importantly, the respective queue registers are adapted to handle data transfers as well as request transfers so that all communication between the storage and the unit requesting access thereto is through the queue. Thus, once a particular unit has sent its request to the queue, that unit is released to continue its own operations and the control element of the particular invention handles the remaining steps of actual storage access.

More particularly, it is contemplated that the control element of the present invention is to be employed between various peripheral devices and a peripheral storage with the central processing element communicating primarily with a main working storage such that the only major conflict or interference encountered by the central processing element will be with data transfer between the main working storage and the peripheral storage. However, in order to provide greater flexibility, data paths are provided for communication between the central processing element and the peripheral storage as well as between other peripheral devices and the main working storage. The present invention is further adaptable to a storage system employing a plurality of storage units which may be accessed in an interleaved manner to provide a decreased effective storage cycle time.

A feature, then, in the present invention resides in a control element coupled to a plurality of peripheral devices (or more particularly to the channels coupled to such peripheral devices) and to the storage system as well as to the main processing elements of the system, which control element includes a plurality of general purpose buffer registers with input buses interconnecting the respective devices and storage with those registers as well as output buses connecting the respective devices and storage with those registers and in a first priority means to determine the availability and access of the respective devices to the registers and a second priority means to determine the availability and access between the registers and the storage system where the registers are adapted to hold both the storage request information as well as the data to be transferred to or from storage and the peripheral devices. Other features of the present invention include means to interleave the various access requests from the peripheral devices as well as a means to transfer information between the storage system and the main processing portion of the processing system.

These and other objects, advantages, and features of the present invention will be better understood from a review of the following specification taken in conjunction with the drawings wherein.

Figures 16A, 16B:
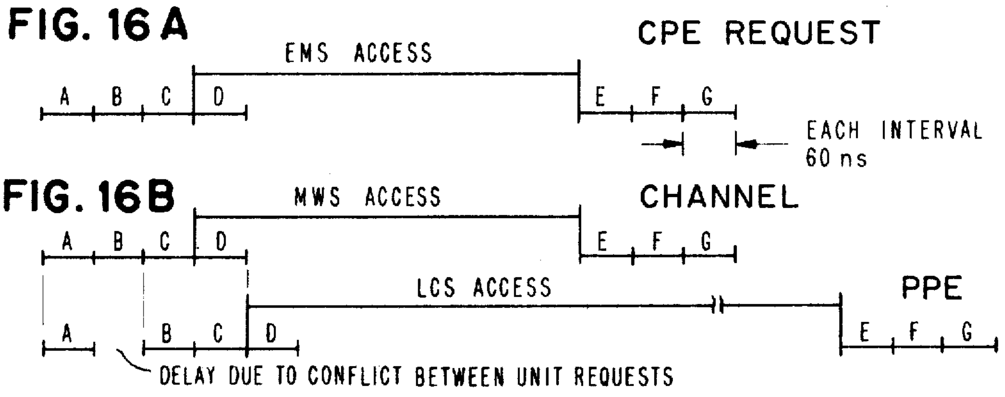

FIGURES 16A and B are timing charts showing the timing relation between various storage and fetch requests.

Figure 1:
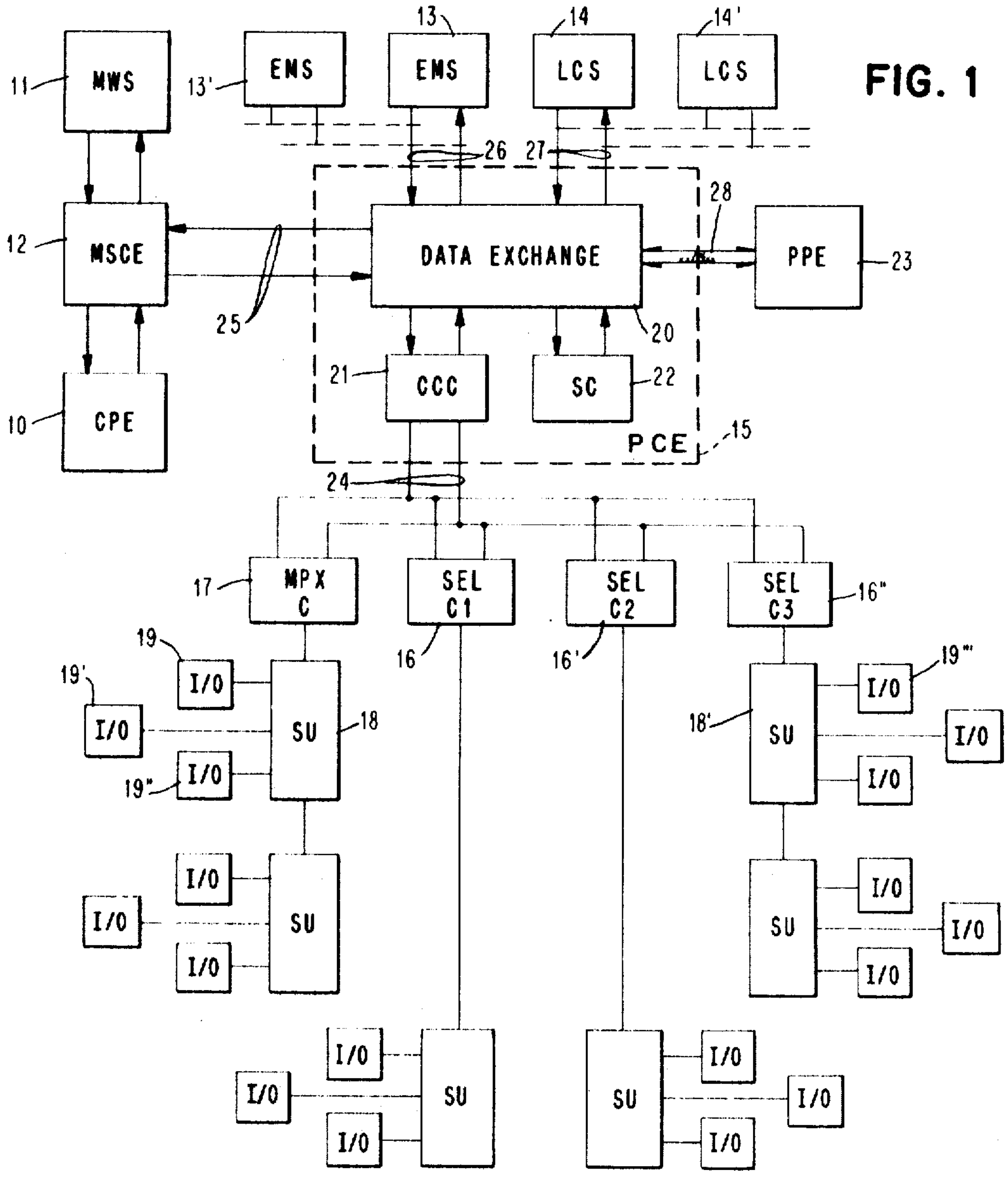
FIGURE 1 is a schematic diagram of a data processing system involving the present invention.
Figure 3:
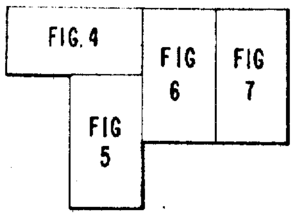
FIGURE 3 is a diagrammatic representation of the relation between the various figures illustrating the present invention.

To briefly describe a data processing system of the type with which the present invention is employed, reference is first made to FIGURE 1 which schematically illustrates such a system. The system includes central processing element 10 in communication with main working store 11 by way of main storage control element 12. Main storage control element 12 may be a typical priority determining bus control unit but preferably is a more sophisticated priority determining element not dissimilar from the present invention in the form of peripheral data exchange 20 with the exception that the main storage control element services fewer units than does the present invention.

Peripheral control element 15 is adapted to control data flow between the main processing portion of the system and the periphery made up of a plurality of I/O devices 19, 19′, . . . as well as a peripheral processing element 23 that may be employed to perform certain specific operations. A feature of the system shown in FIGURE 1, although not necessarily of the present invention, is the provision of a plurality of peripheral stores to receive and store large blocks of data and other information until such is required by the main processing portion of the system. Such peripheral storage devices may be a plurality of extended main stores 13, 13′ which are so called because they are characteristically similar to main working storage 11 in regard to cycle times and storage capacity. Additional peripheral stores are provided in the form of large capacity storage units 14 and 14′ which generally have storage capacities far greater than the extended main storage but have larger cycle times relative thereto.

The respective I/O devices 19, 19′, . . . are coupled to one of a plurality of channels 16, 16′, 16″, and 17 by way of switching or selector units 18, 18′ and standard I/O interfaces. The operation of the various I/O devices are initiated by the execution of an instruction by central processing element 10 and are thereafter monitored by a respective channel which maintains the current address in storage being accessed by the particular I/O device as well as the number of items to be transferred to or from the I/O device. The respective channels also are adapted to update both the storage address and count as data transfer occurs. As indicated in FIGURE 1, there are two types of channels contemplated for employment with present invention. Selector channels 16, 16′, and 16″ are of a type adapted for high speed data transfer from an I/O device such as a high speed tape unit or drum or disc file. Such a channel operates in "burst" mode in that once an interlock has been established between a particular I/O device and the channel, the channel will handle data transfer only from that I/O device. Such a channel is capable of handling data rates of a megabyte per second or greater and may be of a type described in the King et al. application Ser. No. 357,369, filed Apr. 6, 1964 and assigned to the assignee of the present application. The other type of channel contemplated for employment with the present invention is multiplex channel 17 adapted to handle data transfer to or from a plurality of slower I/O devices which may be operating concurrently with their data transfer being handled in a multiplex manner on the standard I/O interface. Such a channel is of a type described in the King et al. application Ser. No. 543,623, filed Apr. 19, 1966, and assigned to the assignee of the present application.

Each of the above referred to applications contain a rather thorough description of the control word format employed to initiate and monitor the transfer of data and other information between the periphery and the system. While a detailed description of this format will not be presented here, a brief description is presented below to the extent necessary to understand the present invention.

Data transfer between the respective channels and the peripheral storage is by way of plurality of a requests being made for storage access which are handled by data exchange 20 of peripheral control element 15. Communication to request selector 20 is by way of I/O interface 24 to common channel control 21 which implements a pre-priority scheme to handle data transfer from any one of the channels at a given time. As further indicated in FIGURE 1, storage channel 22 is coupled to data exchange 20 for the purpose of handling data transfers between the peripheral storages and main working storage 11 by way of main storage interface 25. Actual interconnections to the peripheral storages are by way of extended main store interface 26 and large capacity store interface 27. Additionally, peripheral processing element 23 is coupled to the request selector by means of interface 28 when such a peripheral processing element is to be employed with this system. Having thus defined the respective interfaces by which the peripheral control element of the present invention is coupled to the other units of the data processing system, the remaining description of the present invention will be limited to the peripheral control element itself and to information transfer across such interfaces without regard to the detailed characteristics of the particular units coupled thereto.

Figure 2:
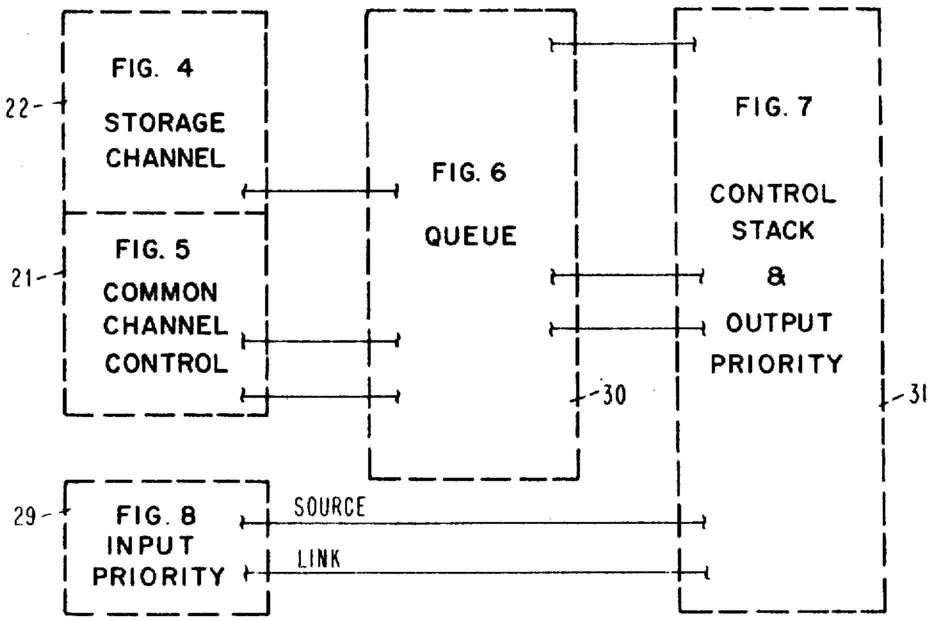
FIGURE 2 is a schematic diagram illustrating the interrelation between the various elements of the present invention.

The data flow through the periphreal control element is normally through the queue of buffer registers to be later described. Thus, with certain exceptions to be later noted, all of the various interfaces are coupled to the queue from which output buses couple again to the respective interfaces. In addition to the storage channel and the common channel control discussed above, two other principal subsections of the peripheral control element are the input priority circuitry and the control stack and output priority circuitry. The organizational interconnection of these respective units is illustrated diagrammatically in FIGURE 2 primarily only to give the reader a general concept of the relation between the various subsections. The respective subsections are illustrated in more detail in FIGURES 4 through 7, and FIGURE 3 simply illustrates the relation between the circuitry of those figures so that the reader may be able to follow the description from one figure to another.

Figure 6:
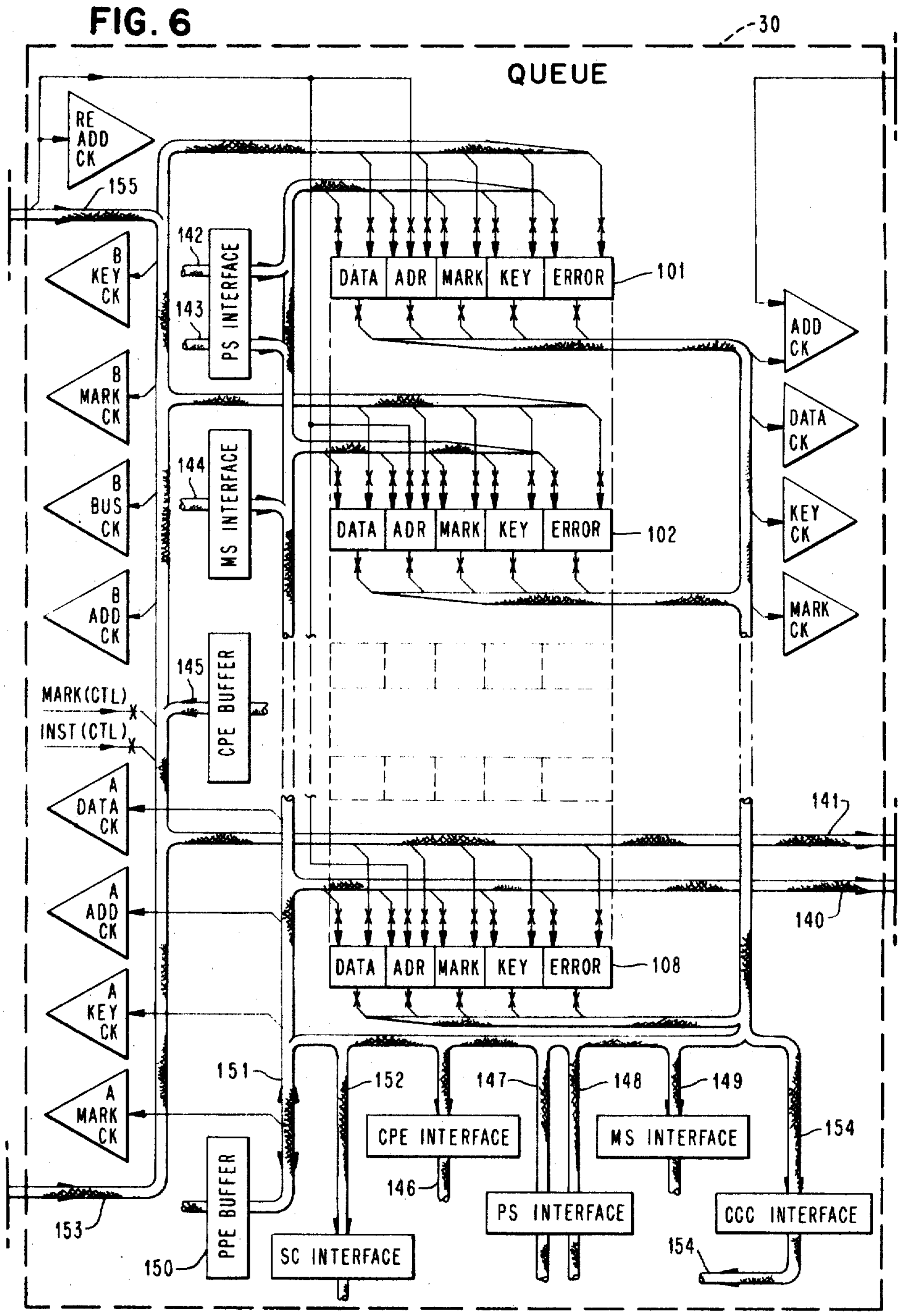
FIGURE 6 is a schematic diagram of the data paths associated with the buffer registers of the present invention.
Figure 9:
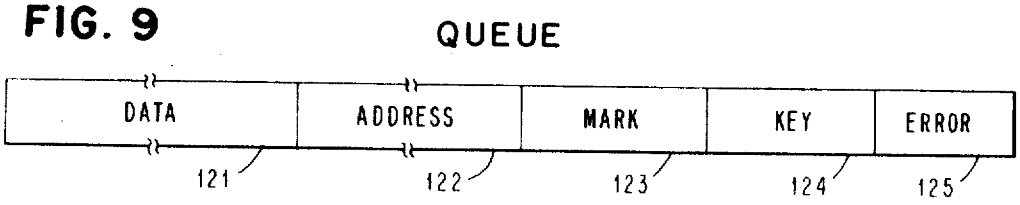
FIGURE 9 is a diagram of the queue register format.

Every memory accessing scheme invloves the presentation of an address representing a particular location in memory to that memory with the subsequent storing or fetching of data at that location. In the present invention both storage location addresses as well as the data to be transferred to or from respective locations are stored in queue 30 until the particular storage is available for a request at which time the address is presented from one of the registers in the queue which register is also to store the data to be transferred to or from that storage location. Referring now to FIGURE 6, the respective queue registers and input and output buses will now be described. Preferably eight registers 101, . . . , 108 are employed to form the queue although more registers may be provided if so required. Each register has a corresponding register in the control stack 31 (FIGURE 7) that contains the current status information of that queue register. The various fields of these respective registers will now be described. Each of the queue registers 101, . . . , 108 is a 115 bit wide register which is divided into five principal fields as indicated by the queue format of FIGURE 9. Data field 121 is comprised of 72 bits to receive eight bytes of data in parallel plus eight parity bits pertaining thereto. This field will hold data to be stored until the storage cycle is initiated or will receive fetched data from storage. Address field 122 is comprised of 24 bits and serves to store the storage address for transmittal to a storage address register when storage cycle is available. Mark field 123 is comprised of eight bits plus a parity bit and specifies which bytes within a double word storage location are to be selected during a store or fetch operation cycle. Key field 124 is comprised of six bits which serve as a storage protection key. Error field 125 contains four bits to indicate respectively a data check error, an address check error, a storage protect violation and an invalid address. During a request to store data, the assigned queue register holds its information until the necessary storage cycle is available. During a request to fetch information, the register holds the pending request until the storage fetch has been completed and the data returned to the requesting unit.

Figure 7:
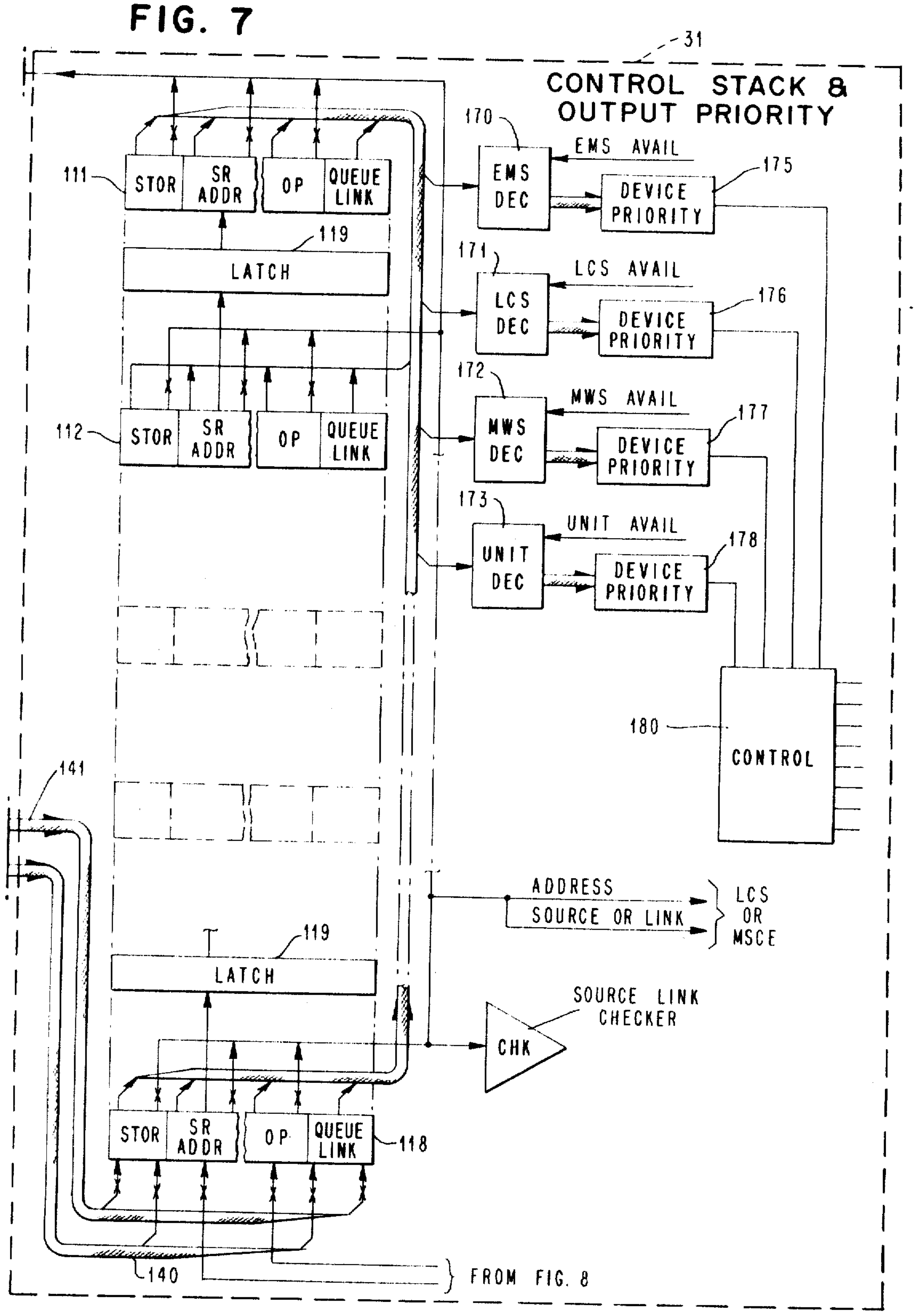
FIGURE 7 is a schematic diagram of the control registers and output priority circuitry of the present invention.
Figure 10:
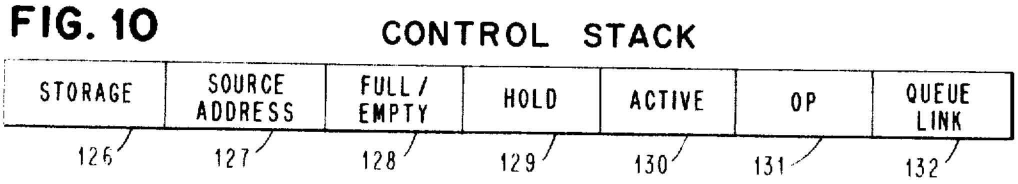
FIGURE 10 is a diagram of the control register format.

Once a request has been accepted and a queue register assigned, the relevant control information pertaining to that request is entered into a control register in control stack 31 as illustrated in FIGURE 7. The format of the control register is illustrated in FIGURE 10. As indicated therein, the control stack registers are 19 bits wide which are divided into seven fields. Storage field 126 is a one bit field which indicates whether the request is for one of the peripheral stores or for the main working store. Source address field 127 is a seven bit field plus a parity bit that designates the requesting unit. Full/empty field 128 is a one bit field that indicates whether the data requested has been fetched and returned to data field 121. Hold field 129 is a one bit field that prevents the corresponding queue and control stack registers from being erased. Active field 130 is a one bit field that indicates that the corresponding control stack and queue registers are currently occupied by a pending request. Operation field 131 is a three bit field which defines one of three central processing operations to be defined later. Queue link field 132 is a four bit field plus a parity bit that designates the current queue register assigned to the present request. As will become more readily apparent from the present disclosure, the above information is all that is necessary to establish priority between accepted requests for an available storage cycle and to initiate the requested data transfer to or from storage for respective requests in the queue.

As illustrated in FIGURE 6 each of the respective queue registers is accessed by common data buses 140 and 141 each of which is specified to have a data path width of 144 bits so as to provide all the required information at any given time. Buses 140 and 141 are also coupled to the bottom register 118 of control stack 31 as illustrated in FIGURE 7. Each new request has its control information entered into the bottom of the stack (register 118) with all previous requests being moved toward the top of the stack by a pluraliy of latch sets 119 which are provided between the respective register 111, . . . , 118 for this purpose.

The respective output buses 146, . . . , 149 to the corresponding storage interfaces as well as input-output bus 151 to the PPE buffer 150 and output bus 154 to the common channel control and output bus 152 storage channel are each directly coupled to each queue registers. Gating of each of the queue registers to one of the respective output buses is governed by the input and output priority circuits that will be discussed below.

In addition to the storage channel and common channel control interconnections with the common buses, four input buses are adapted to access common buses 140 and 141 and four sets of output buses complete the respective data paths across the various interfaces. As shown in FIGURE 6, input bus 142 and input bus 143 connect to common data bus 140 from interface 26 to the extended main store and interface 27 to the large capacity store (see FIGURE 1). Storage requests to both of the peripheral stores are made via output buses 147 and 148 which respectively complete interfaces 26 and 27. Communication across interface 25 (see FIGURE 1) is by way of MSCE interface bus IN 144 and MSCE bus OUT 149. In addition, direct communication is provided between CPE 10 of FIGURE 1 and the peripheral control element by CPE interface bus IN 145 and CPE bus OUT 146. Communication with peripheral processing element 23 across interface 28 is provided for by a single input-output bus 151 as indicated in FIGURE 6.

Communication to the queue stack from the storage channel 22 as well as common channel control 21 is by way of common data bus 141 which is similar in every respect to common data bus 140. Communication to the storage channel and common channel control is by way of output bus 152.

Having thus described the respective queue registers and their interconnections to the various interfaces, a description will now be given of how a storage request is received, buffered in one of the queue registers until the requested storage is available and subsequent data transfer made to or from that storage and to or from the requesting device. Such a description necessarily involves a description of the input and output priority circuits.

Figure 8:
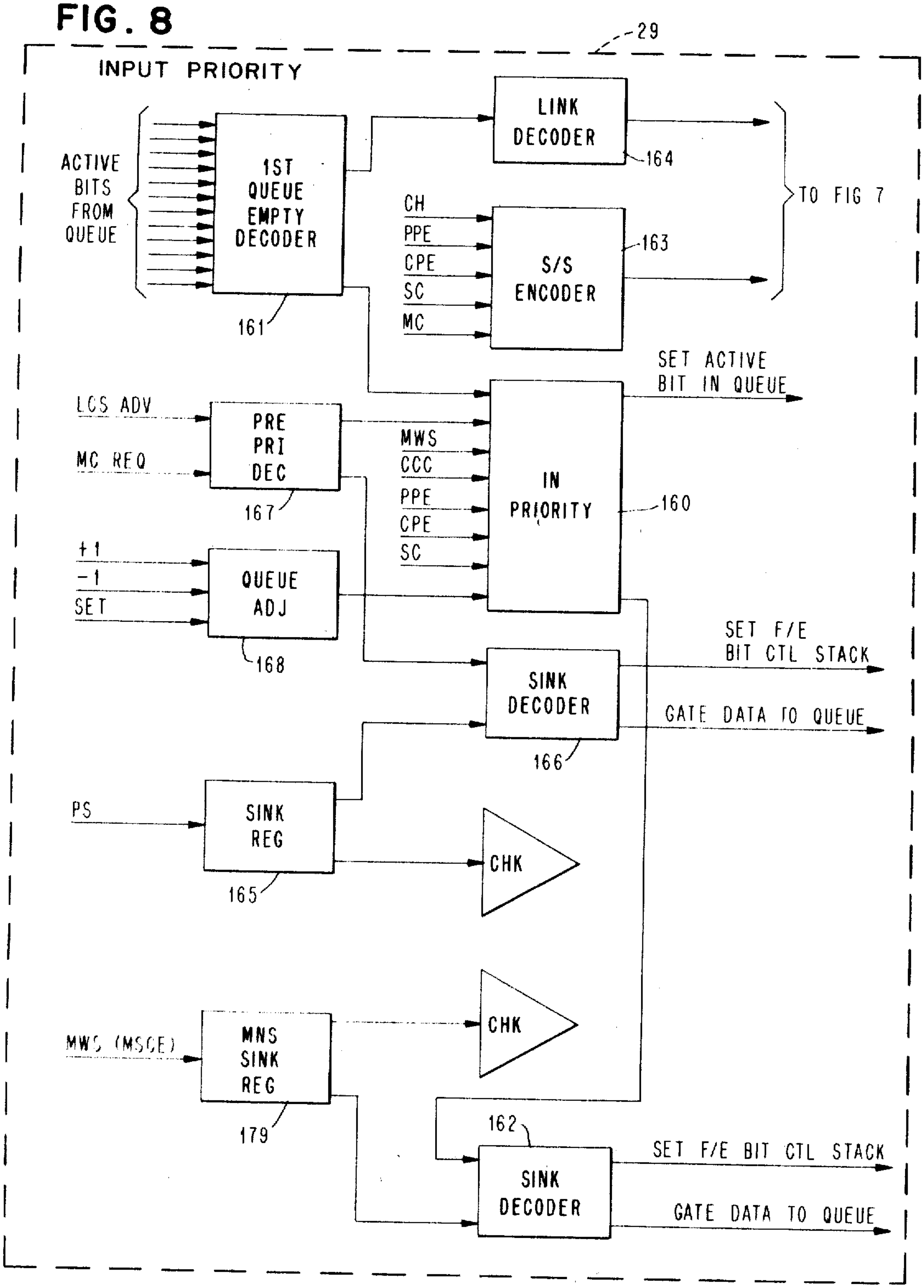
FIGURE 8 is a schematic diagram of the input priority circuitry of the present invention.

Each of the interfaces described above contains a request line and the corresponding device, attached by way of that interface, is adapted to place a signal on the request line to indicate that a data transfer is about to be initiated. As illustrated in FIGURE 8, all such request lines are coupled to an input priority determining circuit 160 which may be of a standard type circuit that accepts a given request signal if there are no higher priority signals being presented to the circuit at that time. Priority circuit 160 is conditioned by a signal from queue empty decoder circuit 161 which signal indicates that there is a queue register available to receive the request. If such a register is not available then the request cannot be honored and the requesting device (except for the CPE) is so signaled by circuitry not shown. Queue empty decoder 161 is adapted to receive individual bit signals from active field 130 (see FIGURE 10) of each of control stack registers 111, . . ., 118 (see FIGURE 7). If more than one queue register is available, queue empty decoder circuit 161 will select one of those registers in a manner that will not be described here since it will be remembered that all of the queue registers are identical in their characteristics. Once an available queue has been selected and priority determined between requests, access to the particular queue register is accomplished by typical gating circuitry in a manner understood by one skilled in the art. Such gating is accomplished in response to a signal generated by priority circuit 160 and decoded by sink decoder 162 as illustrated in FIGURE 8. At this time priority circuit 160 generates a signal to active field 130 of control stack register 118 (see FIGURE 7), source encoder 163 generates an address designating the source making the request which is supplied to source address field 127 of that register, and link encoder 164 generates the queue link designation of the queue register that has been selected which designation is supplied queue link field 132 of register 118. The information now being communicated across the interface to the particular queue register will include the data to be gated to data field 121 of the particular selected queue register, the storage location address to be gated to address field 122, the particular mark bits to be gated to field 123 and storage protection key bits to be gated to key field 124. (See FIGURE 9 for the queue register field format.)

The above description has been directed toward requests received from the common channel controls, the peripheral processing element, the central processing element and the storage channel. However, it will be remembered that data requested from the respective peripheral storages or from the main working store are to be returned to the corresponding queue register by means of common data buses 140 and 141 of FIGURE 6. To establish access to these common data buses, additional circuitry is shown in FIGURE 8 which will be later described in relation to the manner in which the storage requests are actually presented to the various storages by the control stack and output priority circuitry.

Data transfer from the respective queue registers may be made to one of the peripheral stores, to the main working store or to one of the requesting units in a manner which will now be described primarily with reference to FIGURE 7 showing the control stack and output priority. Such requests to the different queues may be made simultaneously since each output bus is coupled to each of the queue registers. Thus once a queue has been given access to a given output bus, there is no other source of interference and other queues may be gated to other output buses in a completely overlapped manner.

Once a given queue has been selected for a request and request information has been placed in that queue and the active bit of field 130 has been set (see FIGURE 10), the respective output circuitry responds to consider the information in the corresponding control stack register to determine the storage or unit return to which the request is directed and the priority of that given request. All active requests for a given storage or unit return are further considered only if that particular storage or unit are available. Thus, if the extended main store is available, then the particular active registers requesting that store are selected by request address decoder 170 and the source addresses and queue links of those particular registers are passed to device priority circuit 175. Similarly, if the large capacity store is available, all registers containing a request for that store are selected by address decoder 171 and the source address and queue links corresponding thereto are presented to device priority circuit 176. All registers containing requests for the main working store are selected by circuit 172 if that store is available. The corresponding source addresses and queue links are presented to priority circuit 177. All unit requests to the various requesting units are selected by decoder 173 and the source addresses and queue links are presented to priority circuit 178. Thus, if the requested unit or store is available, the request for that unit which has the highest priority is selected and the corresponding queue link address of the register holding that request is presented to control matrix 180 which sends the appropriate signal to gate the particular queue register to the appropriate output bus. If there is more than one request from a given source or a given storage, then the first request received is the one granted priority on the basis of its position in the control stack.

Although the respective priority decisions are determined by the priority of the source address in a particular control stack, it is the queue link address which designates the particular queue to be gated to the particular output bus by control matrix 180. Thus, it is the queue link address selected that is presented by the respective priority circuits to control matrix 180. At the time that the data and storage location addresses are gated out of the selected queue register to the particular address bus, the queue link address is also gated to that bus for presentation to the memory data register for reasons which will now be described.

If the storage request has been a fetch request, this is indicated by a particular bit in source address field 127 (see FIGURE 10) and this signal is sent to the particular memory along with the queue link address. When the particular storage has fetched the requested data, the queue link address is sent to sink register 165 (see FIGURE 8) if the request is from either of the peripheral stores. The contents of register 165 are decoded by sink decoder 166. The associated input bus is gated back to the queue register from which the request originated. At the same time that the fetched data is sent to the queue register, a signal is sent to set the bit in full/empty bit field 128 of the corresponding control stack register. If the data return is from main working store, then the queue link address is received by sink decoder 162 which gates input bus 144 of FIGURE 6 to the appropriate queue register and again sets the appropriate full/empty bit in the corresponding control stack register.

Once the active bit in the corresponding control stack has been set and also the full/empty bit has been set to indicate the return of a data fetch, then the above described routine is repeated to transfer the data and other information in the appropriate queue register back to the requesting source as indicated by the source address in the corresponding control stack register.

If the storage request is one to store data, then that data will be gated out of the appropriate queue register along with the storage location address to the appropriate storage as indicated above. Although this request is to store data, the entire routine described above for a fetch request will still be repeated to transfer signals indicating an error occurrence back to the requesting source in the same manner as if data were to be transferred back to the requesting source.

It will be understood that the operation of the peripheral control element just described is synchronized by a clock. The circuitry for the clock has not been shown but may provide a timing pulse with a cycle time of 60 nanoseconds which may be achieved with components and circuit techniques that are currently available.

To better describe the relation between the acceptance of the various requests presented to the control element, reference is made to FIGURES 16A and B which illustrate the elapsed time for three such requests simultaneously made by different requesting units. The timing chart in FIGURE 16A is a typical example of elapsed time required for a request from central processing element 10 for a storage fetch from the extended main store which in this case may have a storage cycle time of 750 nanoseconds. The timing charts in FIGURE 16B are typical examples of unit request for a storage fetch from the main working store which is also a type having a storage cycle time of 750 nanoseconds and also from the large capacity store having a greater cycle time. Each interval is 60 nanoseconds.

Having thus described the various registers, buses and circuitry by which the data exchange receives and executes a storage request, the manner in which such requests are initiated will now be described. The following description pertains not only to the common channel control which in essence receives requests initiated by the respective channels but also to the storage channel which initiates requests for data transfer between the peripheral stores and main working store of the main processing portion of the system. It will be remembered that the main data flow through the data exchange is primarily between the periphery and the peripheral storages and then between the peripheral storages and the main working store as such data is required by the central processing element. Thus, the storage channel is a very important part of the system although not necessarily of the present invention. The storage channel employs a control word format for handling data transfer in the same manner as do the other channels and the storage channel operation is also initiated in the same way as is the operation of the other channels. The requests from the central processing element (CPE) and the peripheral processing element (PPE) are initiated in the standard way that a central processor makes a storage request.

Before describing the circuitry and operation of the storage channel and the common channel control, it is believed to be in order to describe the format of binary code combinations which serve as instructions, commands and control orders to initiate the operation of the respective channels in directing the flow of information I/O devices and respective storages. An instruction is decoded by the CPE. The instruction may be a START I/O, HALT I/O, TEST I/O or a test channel. Commands are fetched from storage by the particular channel when a START I/O instruction is received. Commands, after decoding, initiate the I/O operation. The channel is capable of executing write, read, read backwards, control, sense and transfer-in-channel commands. A control command indicates an operation at an I/O device that may not involve transmission of data, e.g., backspacing or rewinding magnetic tape.

Figure 11:
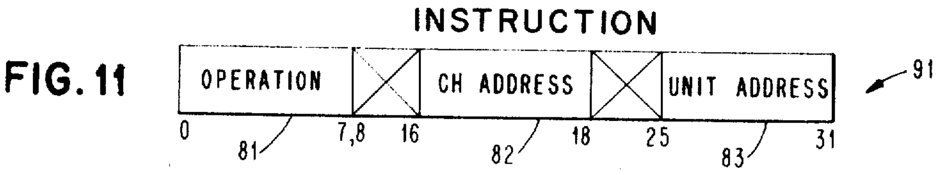
FIGURE 11 is a diagram of an instruction word format.

Referring to FIGURE 11, an instruction format 91 is indicated as comprising 32 binary bit positions. The instruction format comprises an operation code field 81, a channel address field 82 and a device or unit address field 83. The operation code is eight binary bits and may specify a START I/O, TEST I/O, HALT I/O and test channel operation. Bit positions eight through fifteen and eighteen through twenty-five of the instruction format are ignored. The channel address field comprises three binary bits and the device address field comprises eight binary bits.

Figure 12:
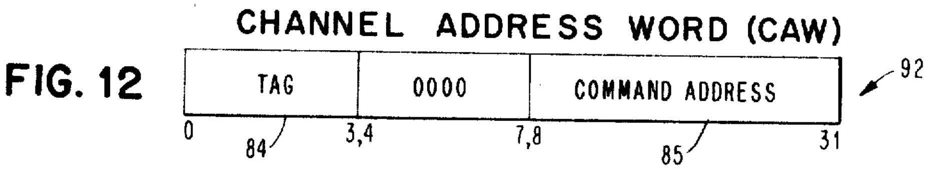
FIGURE 12 is a diagram of a channel address world (CAW) format.

A START I/O operation code directs the channel to enter storage at a designated location and obtain a channel address word (CAW). The format of which is illustrated in FIGURE 12.

Essentially, the CAW 92 is an indirect address to provide the location in storage of the desired command. The CAW, as indicated in FIGURE 12 has 32 binary bit positions including a tag field 84 and a command address field 85. The tag field 84 has four bits which control the access to the storage area in which the I/O operation, i.e., read, write, read backwards, etc., will be performed. The command address field 85 specifies the location of a command control word (CCW) which describes the particular I/O operation to be performed. The bit positions four through seven must be binary zeros for CAW validity purposes.

Figure 13:
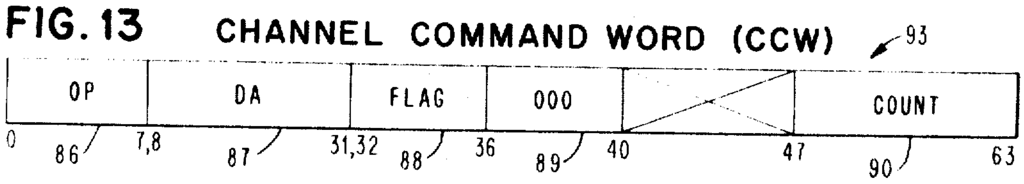
FIGURE 13 is a diagram of a channel command word (CCW) format.

Referring to FIGURE 13, a channel command word (CCW) 93 format of 64 bit positions plus eight parity bits (not shown) includes an operation code field 86 of eight bits; a data address field 87 of 24 bits; a flag field 88 of five bits; a buffer field 89 of three bits; and a count field 90 of 16 bits. The bit positions 40 through 47 are ignored. The operation code field 86 specifies the operation, i.e., read, write, etc., to be performed. The data address field 87 specifies an eight byte storage location in the storage where the data is to be stored or fetched. The count field 90 specifies the number of data bytes to be transferred. Bit positions 37–39 indicate the validity of the CCW. The flag field 88 comprises a chain data address flag bit, a chain command flag bit, a suppress-incorrect length indication flag bit, a skip flag bit, and a program control interruption flag bit.

Figure 14:
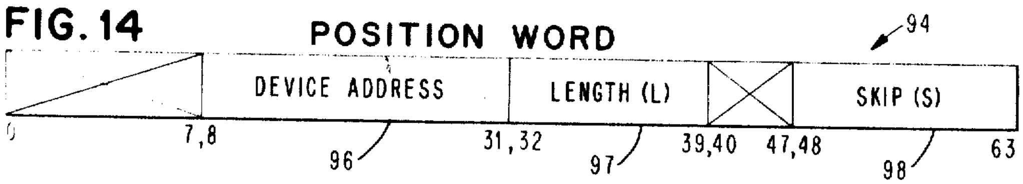
FIGURE 14 is a diagram of a position word format.

The position word format 94 of FIGURE 14 relates solely to storage channel operation and will be more thoroughly described in relation thereto.

Figure 15:
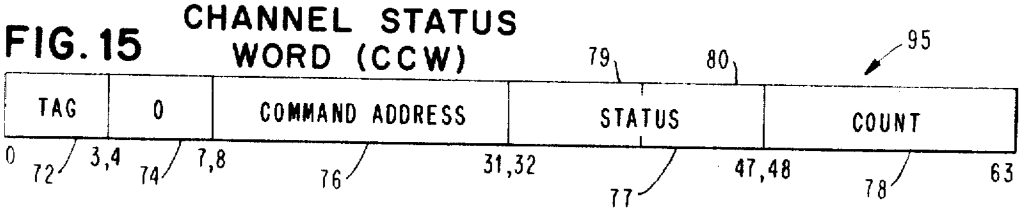
FIGURE 15 is a diagram of a channel status word (CSW) format.

Referring to FIGURE 15, a channel status word (CSW) 95 comprises a memory tag field 72, a buffer field 74, a command address field 76, a status field 77 comprising a device field 79 and a channel field 80 as well as a count field 78. The CSW provides to the program the status of an I/O device or the conditions under which an I/O operation have been terminated. The tag field 72 contains the memory area location in which the operation was being performed. The command address field 76 specifies an address that is eight bytes higher than the last command address used in the operation being performed. The eight bit device status field 77 describes the status of the I/O device presently connected to the channel. The conditions indicated by field 79 are attention, control unit end, busy, channel end, device end, unit check and unit exception. Each condition may be modified by the presence of modifying bits.

The format of the above described instructions and command words as well as the various interfaces between the channel and connecting units (that is, the I/O interface, the CPU-channel interface, and the like) have been designed to accommodate operations according to a particular systems architecture. A more detailed description of these operations appears in the above identified King, et al. patent application Ser. No. 357,369.

The data paths of the system in which the present invention is embodied are of a standardized width of eight bits, a unit referred to as a byte. Many data paths will have larger widths which, in general, will be multiples of this unit, the largest data path width as indicated above being eight bytes or 64 bits. As a practical matter each data path will have an additional parity bit for each byte of data; however, this feature is not pertinent to the present invention and in general will not be discussed.

The various buses described above and to be described below will contain different numbers of conductors, or stated differently the various buses will have different data path widths. The widths of the various data paths can be readily determined from the drawings by observation of the size of the registers to which they are connected.

It will be noted that incoming requests from both CPE 10 and peripheral processing element 23 may be buffered before access is given to the queue registers and accordingly in FIGURE 6 buffer registers are indicated as being coupled between the common data bus 151 and the respective buses 145 and 151 from the respective processing elements. The circuitry of these buffer registers, as well as the other registers discussed above, and the necessary gating circuitry employed between the various buses and registers to gate the various segments of data into the various portions of such registers have not been shown. However, standard circuits of a type employed may be found, for example, in the above referred to King, et al. application Ser. No. 357,369. Similarly, the particular clocking circuitry required to cycle the various operations has not been shown. Peripheral control element 15 (FIGURE 1) may have a separate clock in which case it is asynchronous relative to the peripheral devices and the main processing portion of the system. However, it is preferable that the peripheral control element 15 and main storage control element (MSCE) 12 (see FIGURE 1) have the same clocking system to accommodate data transfer across interface 25 in a manner completely synchronized with MSCE 12.

The storage channel responds to the same command word format to function in a manner similar to that of other channels attached to the peripheral control element with certain exceptions and modifications to be described below. Data transfer by the storage channel is initiated by the decoding of a START I/O instruction by central processing element (CPE) 10 (FIGURE 1) in response to which the storage channel automatically requests access to a given storage location via the data exchange 20 to retrieve a channel address word (FIGURE 13) containing the address of a first channel command word. This address is presented in turn to data exchange 20 to access the particular storage location containing this first channel command word. When the first channel command word is returned to the storage channel it will contain another storage address which normally would specify a storage location to or from which data transfer is to begin. However in the case of the first channel command word received by the storage channel, the data address contained therein specifies the location in storage of a position word (FIGURE 14) to be retrieved by presensation of that address to the data exchange. The operation field 86 of this first channel command word (see FIGURE 13) is specified to contain only certain modifier bits which specify either a position operation or a position and skip operation which will be described later. The appropriate flags in flag field 88 of this first channel command word will contain appropriate bits to specify a chain command as required for the selection of a second channel command word after the position word has been received by the storage channel via the data exchange 20. Count field 90 of the first channel command word will contain a byte count of four if the position operation is specified or will contain a byte count of eight for the position and skip operation.

Referring now to FIGURE 14, the position word format will now be described. Bit positions zero through seven of this word are ignored. Address field 96 contains a storage address which takes on the attributes of a pseudo I/O device. That is to say, the ultimate operation to be performed by the storage channel is to transfer a series of double words (or 8 bytes) to or from storage from or to a pseudo I/O device in this case another storage location specified by device address field 96. Length field 97 specifies the number of words to be transferred before skipping and skip field 98 specifies the number of words to be skipped after L number of words have been transferred.

After the position word has been transferred to the storage channel via data exchange 20, a second channel command word is retrieved from storage in repsonse to the chain command bit residing in the flag field of the first channel command word. The second channel command word is retrieved from a location in storage which has an address that is eight bytes or one double word greater than the address of the first channel command word (that is the address specified by the channel address word retrieved upon the initiation of the START I/O instruction). The second channel command word will have the format of channel command word 93 of FIGURE 13 wherein the operation field 86 specifies the operation such as read, write, or transfer in command. Address field 87 specifies the location in storage into which initial data is to be stored or from which the initial data is to be fetched. The respective flag bits may indicate a chain data or a chain command response upon the completion of the specified operation if such is required by the program and count field 90 specifies the total number of words to be transferred by this command.

Figure 4:
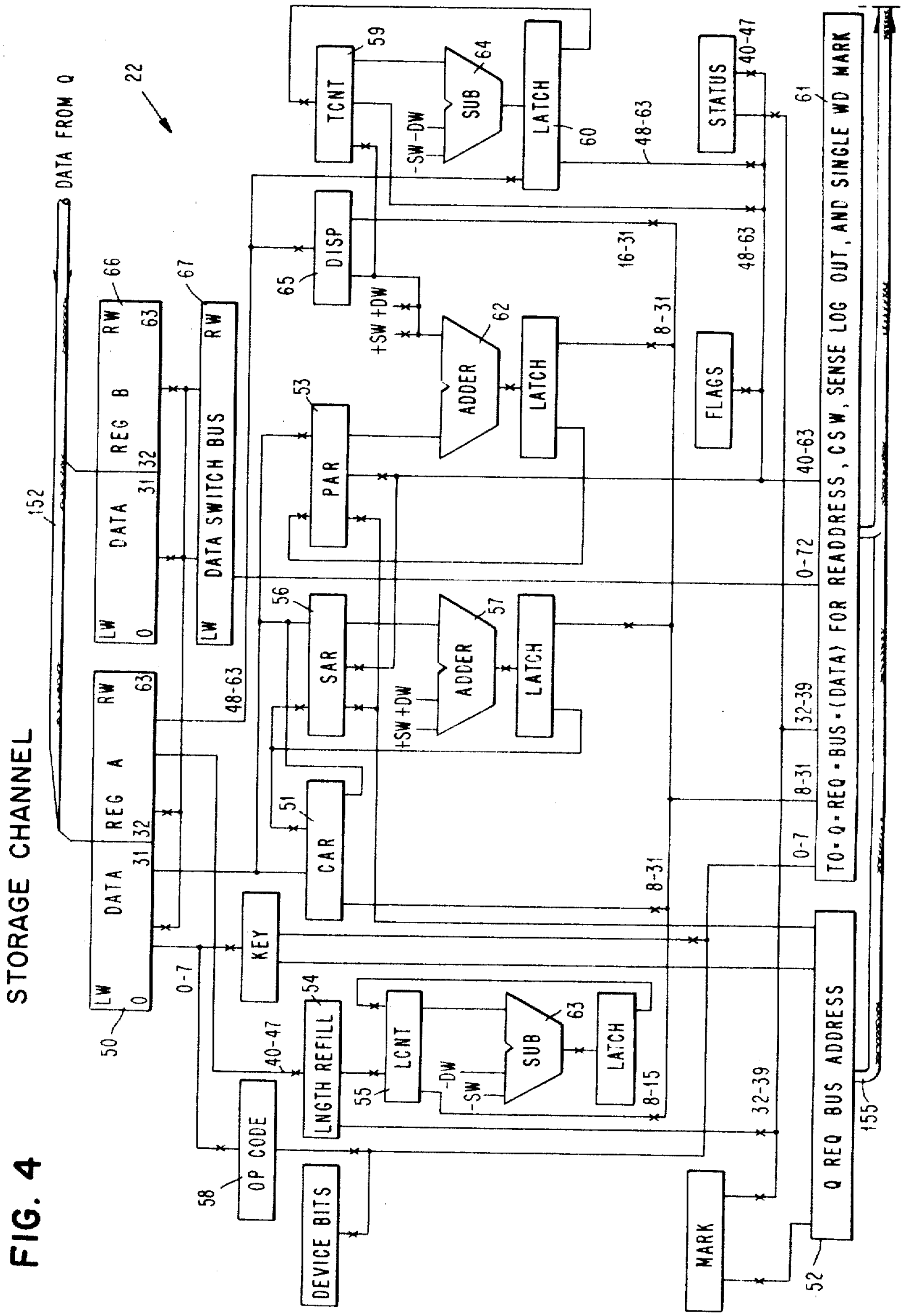
FIGURE 4 is a schematic diagram of the storage channel of the present invention.

To more fully explain the manner in which the storage channel utilizes the above described information to accomplish the required data transfer, reference is now made to FIGURE 4 which is a schematic diagram of the registers and buses of the storage channel. Queue return register 50 of FIGURE 4 is a 64 bit (plus eight parity bits) register adapted to receive information directly from output bus 152 of FIGURE 6. This information will always be transferred out from one of the data fields of the respective queue registers even though such information may be employed by the storage channel as part of the command information. Upon the decoding of a START I/O instruction by the CPE, the storage channel automatically requests a storage fetch of data exchange 20 to retrieve the above described channel address word. The command address field of the channel address word is transferred from queue return register 50 to command address register 51 for subsequent presentation to input bus 155 of data exchange 20 by way of queue request register 52 to request the first channel command word. Upon receipt of the first channel command word by queue return register 50, the control field thereof is decoded by circuitry (not shown) to specify whether the storage channel operation is a position operation or a position and skip operation and the position address of the first channel command word is transferred from queue return register 50 to position address register 53. At this time, the contents of position address register 53 are gated to queue request transfer 52 to request the fetch of the appropriate position word by data exchange 20 which is subsequently presented back to queue return register 50.

Upon presentation of the position word to queue return register 50, device address field 96 (see FIGURE 14) is transferred to position address register 53 to displace the former position address which is no longer needed, the contents of length field 97 are transferred to length refill register 54 which sets length count register 55, and the contents of skip field 98 are transferred to displacement register 65.

Upon retrieval of the first channel command word, the command address specifying the location thereof is transferred to adder 57 by way of storage address register 56 for incrementation by eight (eight bytes or one double word) to specify the next adjacent location of the second channel command word. Upon receipt of the position word by the storage channel, the incremented command address is presented to queue request register 52 to request the fetching of the second channel command word and that address is again passed through adder 57 to increment it by anoher double word designation after which the incremented addresses again placed in register 51. Upon receipt of the second channel command word by queue return register 50, the operation field 86 thereof (see FIGURE 13) is transferred to *Op* code register 58, the data address field 87 thereof is transferred to storage address register 56 and the count field 90 thereof is transferred to total count register 59 by way of latch 60. The respective registers of the storage channel now contain all information necessary for the storage operation.

As indicated above, the storage channel may function in either a position mode or a position and skip mode. If the position and skip operation has been specified, the channel operates to transfer L number of words before skipping S number of locations. If the position operation was specified then the data transfer is completely continuous from contiguous locations starting with the location specified by the contents now in the storage address register 56.

The storage channel and data exchange are adapted to cooperate with one another during the data transfer from one of the peripheral storages to main working store or from one of the main working store locations to peripheral store. The return of a storage fetch to the respective queue register is followed by transfer of that data to the other storage location without the necessity for the respective data segment actually being transferred to or from the storage channel as would be the case in a normal channel operation. When the contents of *Op* code register 58 are first decoded, the contents of storage address register 56 are gated to queue request register 52. At the same time the contents of register 56 are passed through adder 57 and return to storage address register 56 after having been incremented by one double word designation. The contents of position address register 53 are gated to queue data register 61 and at the same time are passed through adder 62 for incrementation by a double word designation and then are returned to position address register 53. When the storage channel request has been honored by data exchange 20 by the assignment of a particular queue register therein, the contents of queue request register 52 are gated to address field 122 of that queue register (see FIGURE 9). The contents of register 61 are gated to data field 121 of the same queue register. At this point, the contents of length count register 55 are passed through subtractor 63 for decrementation of one double word designation and replaced in latch count register 55. At the same time, the contents of total count register 59 are passed through subtractor 64 for decrementation by one double word designation and replaced in total count register 59.

When the particular queue register to which the above referred to information has been gated is granted priority to the appropriate storage location and the storage fetch operation initiated, the contents of the data register which specify the new storage address are gated out of data field 121 (FIGURE 9) and back into the same queue register to address field 122 with an appropriate resetting of source address field 127 of the control stack register (see FIGURE 10). When the storage fetch has been completed and the data requested by that fetch returned to queue data field 121, the full/empty bit field 128 of the control stack register is set signifying a data return. Upon the granting of output priority to the now specified storage location, the contents of data field 121 of the queue register are gated out to complete the store operation.

In the meantime, the storage channel will have requested the next storage transfer operation if another queue register is available and input priority granted to the storage channel. The respective storage address and position or device address required for this next operation have already been obtained by updating of the previous respective address. The above defined routine is repeated the number of times specified by length count register 55 (FIGURE 4). When the contents of length count register have been decremented to zero, the contents of displacement register 65 are gated to adder 62 for addition to the present contents of position register 53 the sum thereof being placed back in position register 53. At the same time, length count register 55 is again filled with the contents of length refill register 54 and the above described routines are repeated until the contents of length count register 55 have again been decremented to zero. The entire procedures are repeated until the contents of total count register 59 have been decremented to zero at which time the operation specified by the last channel command word have been completed. If the last channel command word contained a command chaining bit in its flag field, such chaining is accomplished by the presentation of the contents of command address register 51 to queue request register 52 to request the fetch of a new channel command word by data exchange 20.

In the above described procedures, the particular storage addresses and position or device addresses referred to double word locations in the respective storages. That is to say, the respective storages are normally arranged with double word boundaries or boundaries for locations of eight bytes. On occasion, it may be desirable to address the respective storages on a single word boundary basis and to switch the order of two single words in a double word to form a new double word. Such an operation is accomplished automatically by the storage channel whenever the contents of storage address register 56 specify a single word boundary location. A manner in which such an operation is accomplished will now be briefly described.

The respective address registers have the capability of addressing the different storages on single word boundaries although the resultant storage word fetches will be of double words. If the respective addresses are to double word locations, the least significant bits in those addresses will be a zero. If the least significant address bits are unequal then the store address will not be presented to the data exchange along with the initial fetch request but rather the initial fetch request will merely result in the return to the storage channel of a double word which will be placed in queue return register 50. Of this double word, only the second word or bits 32 through 63 will be of significance.

At this time, the contents of storage address register 56 which have already been updated from the previous request are again presented to queue request register 52 for the next storage fetch, the storage address having been updated by a double word designation. The second storage fetch will again be of a double word commencing at a single word boundary and will be returned to data return register 66 as shown in FIGURE 4. At this point, the left word of double word register 66 will be transferred to the right word portion of register 67 and at the same time the right word contained in register 50 will be shifted to the left word portion of register 67. The contents of register 67 are now transferred to the queue data register 61 and the present contents of position or device register 53 will be transferred to queue request register 52 to request the store of the newly formed double word to its new location. In the meantime, the new contents of storage address register 56 are again presented to queue request register 52 and if the data exchange grants priority, another storage fetch from a single word boundary is initiated with a return of a double word by data exchange 20 to register 50. At this point the residue from the last data transfer, that is the right word of double word register 66, is transferred to the left word position of double register 67 and the left word of the contents of double word register 50 is transferred to the right word position of register 67 at which time the newly formed double word is transferred from register 67 to queue data register 61 and the newly updated contents of position address register 53 are transferred to queue request register 52 to request the store of newly formed data word in its new storage location. This routine is repeated until the total count has been decremented to zero. The above described data transfers between registers 50 and 66 to register 67 are performed by conventional logic circuitry that would be understood by one skilled in the art and thus have not been illustrated in FIGURE 4.

The above described storage channel serves mainly to transfer data between the peripheral stores and the main working store of the system, the transfer being through the queue register stack of the data exchange of the present invention. To transfer data between the peripheral stores and the periphery of the system, separate channels of the type described in the above referred to King, et al. application Ser. No. 357,369, are employed. With the present invention as many as ten such data channels may be employed to control a vast number of I/O devices which go to make up the periphery of the system. Such I/O devices may be operating simultaneously and to accommodate all of the channels, buffering as well as pre-priority decisions and pre-data fetching are performed by common channel control unit 21 illustrated in FIGURES 1 and 2. When the respective channels are of the type that can accommodate data rates of the order of one megabyte per second, they may be attached to common channel control (CCC) 21. However, if particular peripheral devices are employed which are capable of data transfer rates of two to three megabytes per second or greater then a separate channel control should be employed to couple such devices to data exchange 20. The particular functions of common channel control 21 will now be described in reference to FIGURE 5.

The common channel control is adapted to receive the initial request to retrieve a channel address word and then a channel command word from storage pursuant to the decoding of a START I/O instruction by the central processing element in the same manner as does the storage channel as discussed above. Thereupon the common channel receives the channel command word from data exchange 20 and transfers that channel command word to the particular channel to initiate the data transfer to the particular I/O device coupled thereto. Once the data transfer has been started, the common channel control is responsive to the request by the channel to in turn request access to an available queue register of data exchange 20 and upon the granting of access thereto, to transfer the particular data to or from the queue.

All channels are connected to the common channel control by means of I/O interface 159 with the channel control also being connected to the respective queue registers by queue input bus 153 with data and error returns being by queue output bus 154. Input requests are supplied from the common channel control to input priority circuitry 160 (see FIGURE 8) by way of input priority bus 169 with output priority selections being communicated by the output priority circuit of FIGURE 7 to the common channel control by way of bus 156. Initial selection of the respective channels by the decoding of a START I/O instruction by the CPU is communicated to the common channel control by means of bus 157.

Upon the decoding of a START I/O instruction by the CPU, the channel address and the unit address are transmitted by way of bus 157 to the common channel control which transmits these respective addresses to the particular channel across I/O interface 159. The channel address is also supplied to control circuitry 32 in order to reserve a certain number of queue registers for that channel depending upon the priority of the channel in a manner that will later be described. As in the case of the storage channel, the respective data channels first request a channel address word from storage which request is received from I/O interface 159 by means of channel controls and interlock circuitry 33. Should more than one channel request service at any given instance, the channel having highest priority is selected by storage request priority circuit 34. In response to the address of the highest priority requesting channel, input priority controls request access to input priority circuitry 160 of FIGURE 8 by way of input priority controls 35. Upon the selection of a register of the queue stack, the input priority circuitry of FIGURE 5 sends an acknowledge or response signal back to control circuitry 35 in a manner that was discussed in reference to the data exchange input priority circuitry. Thereupon, the channel source address that was supplied to input priority control circuitry 35 from interface 159 via storage request priority circuitry 34 is transferred to the selected queue register over queue input bus 153. While the process thus described has been in reference to the selection of a channel address word by a particular channel, the same procedure is followed for any other request by a particular channel. If the storage request is a request to store data, that data is presented to the selected queue register input bus 153 from I/O interface 159 by way of interface gates 36.

If the storage request has been a fetch request, the selection of the common channel controls by the output priority circuitry of FIGURE 7 is indicated by a select signal received over output priority bus 156 by return interlock circuitry 37 that sets return controls 38. Should any interrupt conditions occur at the channel, such conditions are signaled across I/O interface 159 to process controls 32 and to the CPE across bus 157. A detailed explanation of how such interrupt conditions are created and transferred from the channel to the CPE as well as the manner in which the various interlocks are established therebetween will be found in the above referred to King et al. patent application, Ser. No. 357,369. Upon establishing of the return conditions and corresponding interlocks across I/O interface 159, the fetched data and error condition signals are returned from queue output bus 154 to common channel control return buffer register 39 and then to the corresponding channel across I/O interface 159.

In addition to the pre-priority selection of the respective channels by the common channel control, the common channel control also serves to reserve certain queue registers for particular high speed I/O devices and also to perform a pre-fetching function that will now be described. In order to allow channels with high data rates to be overlapped with slow speed channels and with CPE operation, the effective number of queues available is reduced by the reservation of certain quenes for the different channels depending upon their data rates. For a selector channel capable of data rates of one megabyte per second or higher, a single queue is reserved for each channel specifically selected if that channel is addressing the extended main storage which has a storage cycle time the same order of magnitude as the main working store. If the particular selected channel is addressing the large capacity store (which has a significantly larger cycle time) then two queue registers are reserved for that selected channel. The maximum number of queues that may be reserved are four or six for the high speed channels depending on the data rate of the requested peripheral storage. For lower speed channels including the multiplex channel, a maximum of two queues may be shared by all such channels in operation.

The reservation of such queues is made at the time the particular channel is selected upon the decoding of a START I/O instruction by the central processor. The channel selection is decoded by process controls 32 which signal the reservation control 40 that in turn determines the number of queues to be reserved in accordance to the above described schedule, the reservation being completed by standard logic circuitry that will be known to one skilled in the art. Upon the determination of the number of queues to be reserved, a signal is sent over bus 158 to set queue empty decoder 161 of input priority circuitry of FIGURE 8. Acceptance of the reservation signal is acknowledged by respond signal sent back to reservation controls 40. The number of queue registers that have been reserved or that are available for reservation are indicated by four counters 41, 42, 43 and 44 which respectively indicate at any given time the number of queue registers reserved for low speed devices, the number of queue registers available for low speed devices, the number of queue registers handling a request at that given moment for slow speed devices, and the number of high speed queue registers reserved and in use.

In addition to reserving queue registers for operation of the channels, the common channel control of FIGURE 5 also serves to pre-fetch data requests for the high speed channels in a manner that will now be described. As in the case of the reservation schedule explained above, the respective pre-fetching operations are predetermined and are initiated in response to the decoding of the START I/O instruction by the central processing element and detected by the common channel control when the channel address and unit address are presented thereto. The information decoded from the START I/O instruction does not specify the particular storage unit being addressed. However, this information is provided in the first channel command word retrieved for the particular channel in question.

Figure 5:
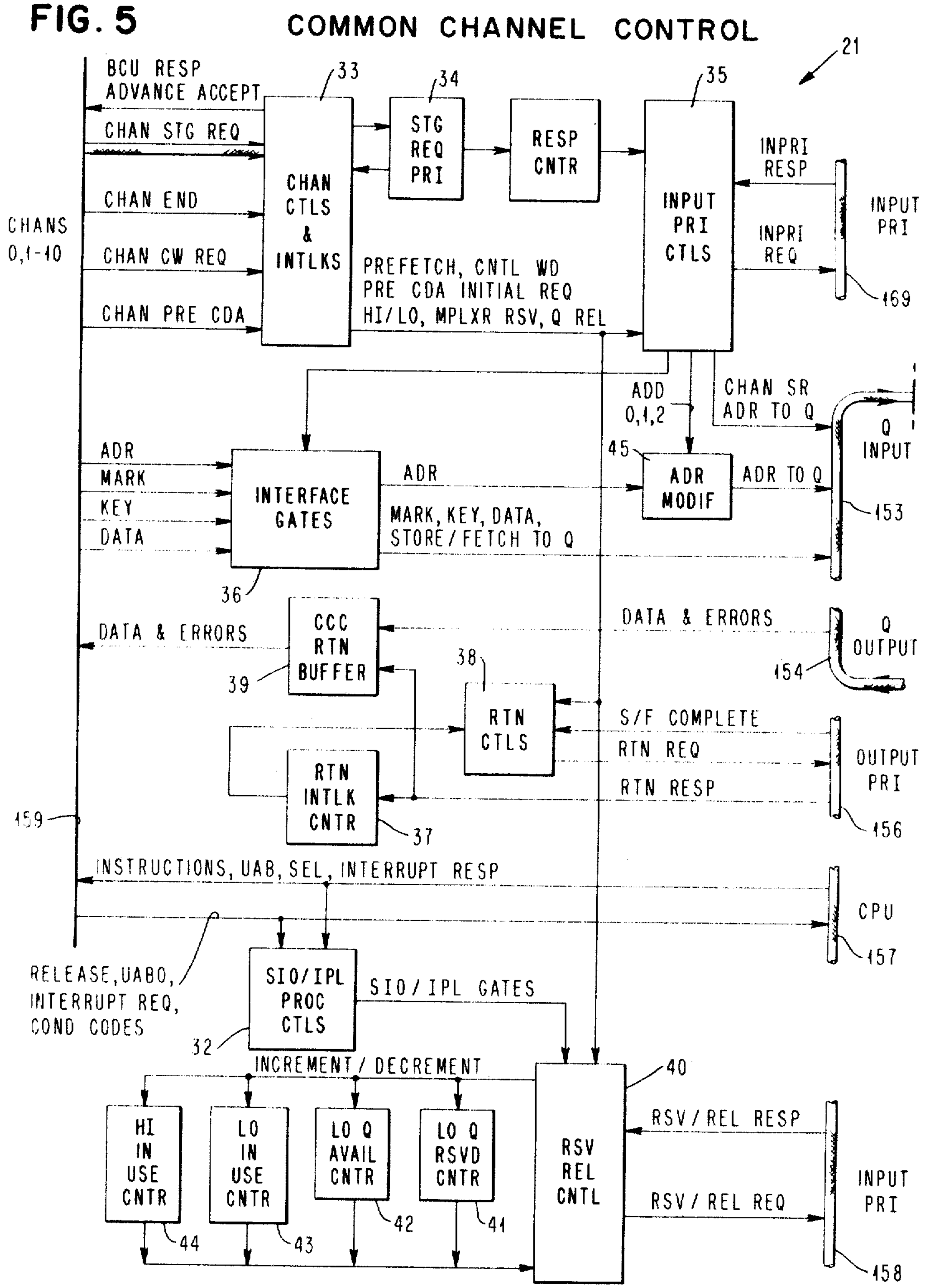
FIGURE 5 is a schematic diagram of the common I/O control of the present invention.

Upon the storage request by a given channel being accepted by storage request priority circuitry 34 of FIGURE 5, and access to the queue registers being given by the input circuitry of FIGURE 8, the address of the location at which the fetch is to be made is passed through address modifier 45 and placed in the appropriate address field of the queue register selected to handle the current request. If the storage request priority circuitry 34 has denoted that the particular channel making the request is a high speed request, this condition is signaled to address modifier 45 by input priority controls 35 in which case the address is retained and incremented by one double word with a second fetch request of the data exchange being made by input priority controls 35 if another queue register is available and access thereto is granted by the input priority circuitry of FIGURE 8. If the address modifier 45 detects that the storage location address is for the large capacity store then the above procedure is repeated again by double incrementation of the original data address to provide at least two prefetches from the large capacity store for the high speed channel. The above routine will be repeated as often as the particuar channel is granted priority to the common channel control circuitry, the routine being ended when the channel has sent a channel end condition signal through channel controls and interlocks 33 which channel end signal is generated by the channel when the total count being kept thereby has been decremented to zero in a manner similar to that by which routines are ended in the storage channel as has been discussed above.

Various modifications of the above described embodiment may be made to further enhance the operation of the data exchange and controls of the present invention. For example, the description of FIGURES 6 and 7 has indicated that each of the output buses from the respective queue registers are individually connected to each of the respective registers while the input buses are connected to the respective registers through two common data buses 140 and 141. In another embodiment of the present invention all of the respective output buses and input buses may be each separately connected to each of the individual queue registers thereby eliminating any interference conflict that might occur on the respective common data buses of the embodiment illustrated in FIGURE 6. Furthermore, with such modifications, it is no longer necessary to design the control stack registers for a push up mode of operation as illustrated in FIGURE 7 with each new request being entered into the bottom control stack register 118. Each respective control stack register can now be associated directly with the corresponding queue register with all control information being entered directly from the input priority circuitry through separate buses. Such modifications do not require any change in the input and output priority schemes that have been described.

It will be understood from the foregoing description of the various embodiments and modifications, that additional modifications and changes in form and details may be made without departing from the spirit and the scope of the invention as claimed.

What is claimed is:

1. In a data processing system having a central processor, a storage having a storage address register and a plurality of peripheral device adapted to generate a signal requesting access to said storage; data control transfer circuitry comprising:

a data exchange coupled between said devices and said storage and having a plurality of registers each adapted to receive said requesting signal;

first control means coupled to said registers and adapted to selectively transfer said request signal to one of said registers; and second control means coupled to said registers and to said storage and responsive to the receipt of said requesting signal by said register to transfer said requesting signals to said storage.

2. A data transfer control circuitry according to claim 1 within said first control means is further adapted to selectively transfer a second request signal from a second peripheral device to a second register in a manner overlapped in time with the transfer of the other requesting signal into or out of the other register.

3. In a data processing system having a central processor, a storage having a storage address register, and a plurality of peripheral devices adapted to generate signals requesting access to said storage; data transfer control circuitry comprising:

a data exchange coupled between said devices and said storage and having a plurality of registers each capable of receiving a requesting signal;

first control means coupled to said registers and adapted to select a separate register for each separate incoming request signal, said selection to be made from among those registers not already holding a request signal; and second control means coupled to said registers and adapted to transfer to storage that request signal having highest priority.

4. In a data processing system having a central processor, a storage, and a plurality of peripheral devices, each adapted to generate a request signal requesting access to said storage, a data exchange comprising:

a plurality of registers each having a given number of bit positions;

a plurality of input buses each of which is coupled to one of said peripheral devices, an additional input bus being coupled to said storage, each of said buses having a number of conductors each of which is adapted to be connected to a significant bit position of each of said registers;

a plurality of output buses each of which is coupled to one of said peripheral devices, an additional output bus being coupled to said storage, said output buses having a number of conductors each of which is adapted to be connected to a significant bit position of each of said registers; and selective gating means responsive to a request signal from one of said devices for electrically connecting the significant bit positions of one of said registers to the corresponding conductors of one of said input buses, whereby said request signal is transferred to said one of said registers.

5. In a data processing system having a central processor, a plurality of storages, and a plurality of peripheral levices, each adapted to generate a request signal requesting access to one of said storages, a data exchange comprising:

a plurality of registers having a given number of bit positions;

a plurality of input buses each of which is coupled to one of said peripheral devices, and additional input buses being coupled to said storages, each of said buses having a number of conductors each of which is adapted to be connected to a significant bit position of each of said registers;

a plurality of output buses each of which is coupled to one of said peripheral devices, and additional output buses being coupled to said storages, said output buses having a number of conductors each of which is adapted to be connected to a significant bit position of each of said registers;

first selective gating means responsive to a request signal from one of said devices for electrically connecting the significant bit positions of one of said registers and the corresponding conductors of the one of said input buses corresponding to the device generating said request signal, whereby said request signal is transferred to said one of said registers; and second selective gating means responsive to means in a register holding a request for electrically connecting the significant bit position of said register to the corresponding conductors of the one of said output buses corresponding to the storage to which the request is directed.

6. In a data processing system having a central processor, a storage having a storage address register, and a plurality of peripheral devices adapted to generate signals requesting access to said storage; data transfer control cicuitry comprising:

a plurality of registers each having a given number of bit positions;

a plurality of input buses each of which is connected to one of said peripheral devices, an additional input bus being connected to said storage, said input buses having a number of conductors each of which is adapted to be connected to a given significant bit position of each of said registers;

a plurality of output buses each of which is connected to one of said peripheral devices, an additional output bus being connected to said storage, said output buses having a number of conductors each of which is adapted to be connected to a significant bit position of each of said registers; and input control means responsive to a request signal emanating from one of said peripheral devices for electrically connecting a particular register to the input bus connected to that device.

7. In a data processing system having a central processor, a storage having a storage address register, and a plurality of peripheral devices adapted to generate signals requesting access to said storage; data transfer control circuitry comprising:

a plurality of registers each having a given number of bit positions;

a plurality of input buses each of which is connected to one of said peripheral devices, an additional input bus being connected to said storage; said input buses having a number of conductors each of which is adapted to be connected to a given significant bit position of each of said registers;

a plurality of output buses each of which is connected to one of said peripheral devices, an additional output bus being connected to said storage, said buses having a number of conductors each of which is adapted to be connected to a significant bit position of each of said registers;

input control means responsive to a request signal emanating from one of said peripheral devices for electrically connecting a particular register to the input bus coupled to that device and for storing a manifestation of said request signal in said particular register; and output control means for electrically connecting said register to the output bus connected to said storage in response to said manifestation of said request signal stored in said particular register.

8. Data transfer control circuitry according to claim 7 wherein said input control means is further adapted to electrically connect said particular register to the input bus coupled to said storage for receipt of a data segment therefrom.

9. Data transfer control circuitry according to claim 8 wherein said output control means is further adapted to electrically connect said particular register to the output bus coupled to said requesting device in response to the receipt of said data segment by said register.

10. In a data processing system having a storage and a plurality of peripheral devices having different priorities and adapted to generate signals requesting access to said storage; data transfer control circuitry comprising:

a data exchange coupled between said devices and said storage and including a plurality of registers having a given number of bit positions;

a plurality of input buses each of which is coupled to one of said peripheral devices, an additional input bus being coupled to said storage, each of said input buses having a number of conductors each of which is coupled to a significant bit position of each of said registers;

a plurality of output buses each of which is coupled to one of said peripheral devices, an additional output bus being coupled to said storage, said output buses having a number of conductors each of which is coupled to a significant bit position of each of said registers; and control means coupled to said registers and adapted to select a separate register for each separate incoming request signal, said selection to be made from among those registers not already holding a request signal.

11. In a data processing system having a storage and a plurality of peripheral devices having different priorities and adapted to generate signals requesting access to said storage, data transfer control circuitry comprising:

a data exchange coupled between said devices and said storage and including a plurality of registers having a given number of bit positions;

a plurality of input buses each of which is coupled to one of said peripheral devices, an additional input bus being coupled to said storage, each of said input buses having a number of conductors each of which is coupled to a significant bit position of each of said registers;

a plurality of output buses each of which is coupled to one of said periphreal devices, an additional output bus being coupled to said storage, said output buses having a number of conductors each of which is coupled to a significant bit position of each of said registers; and first control means coupled to said registers and adapted to select a separate register for each separate incoming request signal, said selection to be made from among those registers not already holding a request signal; and second control means coupled to said registers and adapted to transfer to storage that request signal having highest priority.

12. In a data processing system having a storage and a plurality of peripheral device shaving different priorities and adapted to generate signals requesting access to said storage; data transfer control circuitry comprising:

a data exchange coupled between said devices and said storage and including a plurality of registers having a given number of bit positions;

a plurality of input buses each of which is coupled to one of said peripheral devices, an additional input bus being coupled to said storage, each of said buses having a number of conductors each of which is coupled to a significant bit position of each of said registers;

a plurality of output buses each of which is coupled to one of said peripheral devices, an additional output bus being coupled to said storage, said output buses having a number of conductors each of which is coupled to a significant bit position of each of said registers; and control means responsive to a request signal emanating from one of said peripheral devices to electrically connect a particular register to the input bus coupled to that device to select that register to receive said request signal, said selection being made from among those registers not already holding a request signal.

13. In a data processing system having a storage and a plurality of peripheral devices having different priorities and adapted to generate signals requesting access to said storage; data transfer control circuitry comprising:

a data exchange coupled between said devices and said storage and including a plurality of registers having a given number of bit positions;

a plurality of input buses each of which is coupled to one of said peripheral devices, an additional input bus being coupled to said storage, each of said buses having a number of conductors each of which is coupled to a significant bit position of each of said registers;

a plurality of output buses each of which is coupled to one of said peripheral devices, an additional output bus being coupled to said storage, said output buses having a number of conductors each of which is coupled to a significant bit position of each of said registers;

first control means responsive to a request signal emanating from one of said peripheral devices to electrically connect a particular register to the input bus coupled to that device to select that register to receive said request signal, said selection to be made from among those registers not already holding a request signal; and a second control means coupled to said registers and adapted to electrically connect said register to the output bus coupled to said storage in response to the receipt by said register of said requesting signal and in accordance with the priority of that signal.

14. Data transfer control circuitry according to claim 13 wherein said first control means is further adapted to electrically connect the particular register to the input bus coupled to said storage for receipt of a data segment therefrom.

15. Data transfer control circuitry according to claim 13 wherein said second control means is further adapted to electrically connect said particular register to the output bus coupled to said requesting device in response to the receipt of said data segment by said particular register.

16. In a data processing system having a central processor and a main storage coupled thereto, a peripheral storage and a plurality of peripheral devices adapted to generate signals requesting access to said storages; data transfer circuitry comprising:

a data exchange coupled to said devices and to said storages and including a plurality of registers having a given number of bit positions;

a plurality of input buses each of which is connected to one of said peripheral devices, additional input buses being connected respectively to said main storage and to said peripheral storage, each of said input buses having a number of conductors each of which is connected to a given significant bit position of each of said registers;

a plurality of output buses each of which is connected to one of said peripheral devices, additional output buses being connected respectively to said main storage and to said peripheral storage, each of said output buses having a number of conductors each of which is connected to a significant bit position of each of said registers;

first control means coupled to said registers and adapted to select a separate register for each separate incoming request signal, said selection to be made from among those registers not already holding a request signal; and second control means coupled to said registers and adapted to select one of the respective storage output buses for electrical connection to said particular register in response to the requesting signal received by said particular register.

17. In a data processing system having a central processor and a main storage coupled thereto, a peripheral storage and a plurality of peripheral devices adapted to generate signals requesting access to said storages; data transfer control circuitry comprising:

a data exchange coupled to said devices and to said storages and having a plurality of registers each capable of receiving a requesting signal;

first control means coupled to said registers and adapted to select a separate register for each incoming request signal, said selection to be made from among those registers not already holding a request signal; and second control means coupled to said registers and adapted to transfer to one of said storages that request signal having highest priority, the selection of the particular storage being in response to the particular request signal.

18. In a data processing system having a storage and a plurality of devices adapted to request data transfer to or from said storage, a data exchange comprising:

a plurality of registers each having a given number of bit positions;

a plurality of input buses each of which is connected to one of said devices, an additional input bus being connected to said storage, each of said input buses having a number of sets of conductors each of which is adapted to be connected to a given set of significant bit positions of each of said registers;

a plurality of output buses each of which is connected to one of said devices, an additional output bus being connected to said storage, each of said output buses having a number of sets of conductors each of which is adapted to be connected to a given set of significant bit positions of each of said registers; and gating means responsive to a request signal from one of said devices for electrically connecting the significant bit positions of one of said registers to the corresponding conductors of one of said input buses and one of said output buses; whereby one of said sets of conductors of said input and output buses being connected to said devices and said storage provides means for transferring data segments to or from said registers and another set of said conductors being coupled to said devices and said storage provides means for transferring storage location addresses to or from said registers.

19. In a data processing system having a storage and a plurality of devices adapted to request data transfer to or from said storage; a data exchange comprising:

a plurality of registers each having a given number of bit positions;

a second plurality of registers associated with said first plurality of registers and having an additional number of bit positions;

a plurality of input buses each of which is connected to one of said devices, an additional input bus being connected to said storage, each of said input buses having a number of sets of conductors each of which is connected to a given set of bit positions of each of said registers;

a plurality of output buses each of which is connected to one of said devices, an additional output bus being connected to said storage, each of said output buses having a number of sets of conductors each of which is connected to a given set of significant bit positions of each of said registers; and means adapted to generate signals indicative of each of said devices requesting a data transfer, one of said sets of conductors coupled to said additional plurality of registers being so adapted as to transfer said signals to one of said second plurality of registers.

20. A data exchange according to claim 19 including means to generate signals indicative of a particular register to which data transfer is to occur, a second set of conductors of said buses being so adapted as to transfer said register indicating signals to one of said second plurality of registers.

References Cited

UNITED STATES PATENTS

| | | | |
|---|---|---|---|
| 3,368,207 | 2/1968 | Beausoleil et al. | 340—172.5 |
| 3,337,855 | 8/1967 | Richard et al. | 340—172.5 |
| 3,307,150 | 2/1967 | Bartlett | 340—172.5 |
| 3,303,476 | 2/1967 | Moyer et al. | 340—172.5 |
| 3,300,763 | 1/1967 | Hoehmann | 340—172.5 |
| 3,297,996 | 1/1967 | Grady | 340—172.5 |
| 3,292,151 | 12/1966 | Barnes et al. | 340—172.5 |
| 3,249,924 | 5/1966 | Furlong | 340—172.5 |
| 3,239,819 | 3/1966 | Masters | 340—172.5 |
| 3,225,334 | 12/1965 | Fields et al. | 340—172.5 |

GARETH D. SHAW, *Primary Examiner.*